Patented Sept. 17, 1929

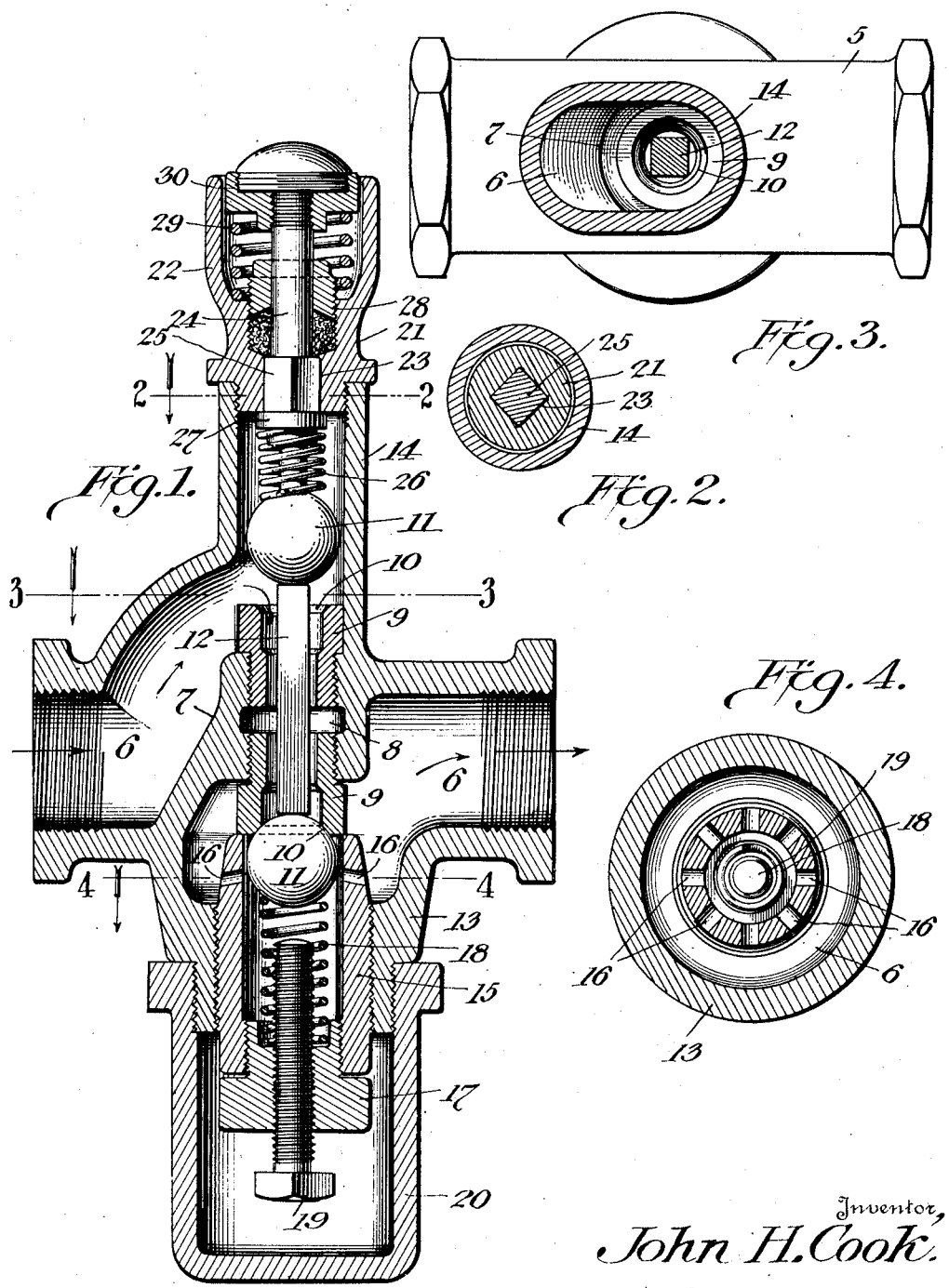

1,728,855

UNITED STATES PATENT OFFICE

JOHN H. COOK, OF SALT LAKE CITY, UTAH

VALVE

Application filed June 13, 1927. Serial No. 198,544.

The present invention relates to valves of the type disclosed in my Patent No. 1,691,626, filed September 29, 1926.

The object is to provide novel and simple means whereby a valve or a valve seat that becomes worn or distorted from any cause can be removed without shutting off the fluid to the valve casing.

In the accompanying drawings:

Figure 1 is a vertical longitudinal sectional view through a valve structure embodying the present invention, Figures 2, 3 and 4 are sectional views on the lines 2—2, 3—3 and 4—4 respectively of Figure 1.

In the embodiment disclosed, a casing is employed, designated 5, and having a passageway 6 therethrough, the walls of which are interiorly threaded for the reception of the threaded ends of pipes or the like. An integral bridge 7 extends across this passageway and has a port 8 opening therethrough. Into this bridge are threaded oppositely faced valve seat elements 9 that are thus removable, their inner ends being spaced apart and their outer ends preferably interiorly beveled, as shown at 10 to provide seating surfaces.

Valves, preferably of the ball type, and shown at 11, are adapted to engage the respective valve seats. These valves are held in predetermined spaced relation by a spacer rod 12 that extends through the valve seat members and port 9, and preferably is angular in cross section, so as to allow the free passage of fluid through the valve seat elements and port.

The valve casing has oppositely outstanding nipples 13 and 14. The nipple 13 is interiorly threaded, and screwed thereinto is a valve cage 15 that abuts against the lower valve seat element 9 and contains at its inner end the lower valve 11. This valve cage is provided with lateral ports 16 through which the fluid can pass. The outer end of the valve cage has a plug 17 screwed thereinto and interposed between the inner end of said plug and the lower valve 11 is a coiled spring 18 that serves to urge the lower valve 11 to its seat and through the instrumentality of the spacer 12 urges the upper valve 11 away from its seat. An abutment screw 19 is threaded through the plug 17 and extends into the spring 18 to a position back of the lower valve 11. It thus determines the amount of movement said valve may have away from its seat. The outer ends of the plug 17 and abutment screw 19 as well as the outer end of the valve cage 15 are enclosed by a hood 20 that is threaded on to the exterior of the lower nipple 13.

A guide member 21 is threaded into the upper end of the upper nipple 14 and carries an outwardly extending guard sleeve 22. This guide member has an opening 23 in its inner end that is angular in cross section. A plunger stem 24 is mounted to reciprocate in the guide member, and has an angular portion 25 slidable in the angular opening 23. The inner end of the guide stem bears upon the upper valve 11, and a spring 26, surrounding said inner end, bears upon the upper valve 11 and against a flange 27 formed on the stem 24. The stem passes through a packing gland 28 located within the guide member, and the upstanding guard sleeve 22 contains a coiled spring 29 that bears against a head 30 located on the upper end of said guide stem.

The operation of the structure is substantially as follows. Assuming conduits are connected to the valve casing, so that liquid will flow in the direction indicated by the arrows in Figure 1, it will be understood that as long as the spring 18 is allowed to act, it will hold the lower valve 11 seated, thus cutting off communication between the ends of the passageway 6, through said casing, and preventing the flow of fluid. If the head 30 is pressed inwardly, the upper valve 11 is moved downwardly, thus forcing the spacer 12 downwardly and unseating the lower valve 11. As a consequence the fluid can flow through the valve casing but the upper valve 11 cannot seat itself because ordinarily the abutment screw 19 is so positioned that it will stop the downward movement of the two valves before the upper valve 11 seats itself on the upper valve seat 10.

In case the lower valve seat 10 or the lower valve 11 becomes worn or misshapen or leaky from any cause and it is desired to examine or replace the parts, if the abutment screw 19 is lowered sufficiently and the upper plunger is pressed downwardly, the upper valve 11 may be seated, thus cutting off the flow of fluid. The lower parts can then be removed, and the valve and spacer detached, the spring 26 and the pressure of the fluid serve to hold the upper valve closed and thus permitting the detachment of all the lower parts, including the lower valve seat and valve.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim is:

1. A valve structure comprising a casing having a port, separately removable valve seats at opposite ends of the port, oppositely operating valves for the respective seats, means in the casing, and operating oppositely against the valves for moving them to their seats one of said means being manually operable, and a spacer interposed between the valves.

2. A valve structure comprising a casing having a port, valve seats at opposite ends of the port, oppositely operating valves for the respective seats, separate means in the casing, and operating oppositely against the valves for moving them to their seats, one of said valves and the valve seat with which it cooperates being removable while the other valve and valve seat remain in position, and a spacer between the valves that is also removable.

3. A valve structure comprising a casing having a bridge, said bridge being provided with a port, separate detachable valve seats carried by the bridge, valves on opposite sides of the bridge that cooperate with the seats, a spacer between the valves passing through the ports, a plunger mounted in the casing and bearing against one of the valves for moving said valves and spacer in one direction, spring means detachably mounted in the casing and bearing against the other valve for moving said valves and spacer in the opposite direction, and a detachable closure holding the spring in place, said closure when detached permitting the removal of the spring and thereby the removal of one of the valves and permitting the seating of the other valve.

4. A valve structure comprising a casing having a port and valve seats on opposite sides of the port, one of the seats being removable independently of the other, valves that are movable into and out of cooperative positions on the seats, the valve that cooperates with the removable seat being also removable, common operating means for both valves, said means causing one valve to be seated and unseated and normally preventing the other valve being seated, and means in the casing for urging the said other valve to be seated and causing its being seated when the first valve is removed.

In testimony whereof, I affix my signature.

JOHN H. COOK.